UNITED STATES PATENT OFFICE.

MYRTIL KAHN, OF ELBERFELD, GERMANY, ASSIGNOR TO THE FARBENFABRIKEN OF ELBERFELD COMPANY, OF NEW YORK, N. Y.

VIOLET DYE.

SPECIFICATION forming part of Letters Patent No. 602,540, dated April 19, 1898.

Application filed December 14, 1897. Serial No. 661,865. (No specimens.) Patented in England May 18, 1893, No. 9,972; in France June 22, 1893, No. 231,037, and in Italy December 31, 1893, XXVIII, 35,187, LXIX, 88.

*To all whom it may concern:*

Be it known that I, MYRTIL KAHN, doctor of philosophy, chemist, (assignor to the FARBENFABRIKEN OF ELBERFELD COMPANY, of New York,) residing at Elberfeld, Germany, have invented a new and useful Improvement in Violet Dyes, (for which the Farbenfabriken, vormals Fr. Bayer & Co., of Elberfeld, Germany, has already obtained Letters Patent in England, No. 9,972, dated May 18, 1893; in France, No. 231,037, dated June 22, 1893, and in Italy, Reg. Gen., Vol. XXVIII, No. 35,187, Reg. Att., Vol. LXIX, No. 88, dated December 31, 1893;) and I hereby declare the following to be a clear and exact description of my invention.

My invention relates to the production of a new tetrazo dyestuff by combining one molecule of tetrazotized dianisidin with one molecule of 2, 3, 6 naphtholdisulfo-acid and further coupling the intermediate product thus obtained with one molecule of paraxylidin.

In carrying out my new process practically I can proceed as follows, (the parts are by weight:) 24.4 parts of dianisidin are tetrazotized in the usual manner. To the resulting tetrazo solution a solution of 32.6 parts of the monosodium salt of 2, 3, 6 naphtholdisulfo-acid in one thousand parts of water and such a quantity of a sodium-carbonate solution is added as is necessary to neutralize the whole free acid contained in the reaction mixture. After stirring for a short while the formation of the intermediate product will be finished. If this stage is reached, a solution prepared from 12.1 parts of paraxylidin and the equivalent quantity of dilute hydrochloric acid is added with stirring. Stirring is continued until free paraxylidin is no longer found to be contained in the mixture. Subsequently the mixture is heated to 50° centigrade and rendered alkaline by means of sodium carbonate. Finally the finished dyestuff is salted out, filtered off, pressed, dried, and pulverized. It is the sodium salt of an acid having the formula:

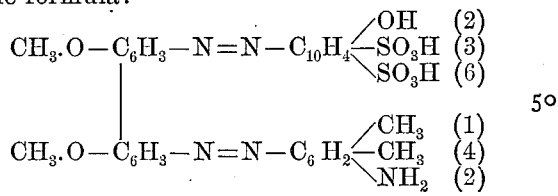

The new dyestuff represents a brownish-black powder with a bronze-like luster, soluble in water with a brownish-violet color, in concentrated sulfuric acid with a blue color, which changes into bluish-violet on the addition of a small quantity of ice, while a blue flaky precipitate is obtained on adding a larger quantity of ice.

The coloring-matter dyes unmordanted cotton violet shades.

Having now described my invention and in what manner the same is to be performed, what I claim as new, and desire to secure by Letters Patent, is—

1. The process for producing a new tetrazo dyestuff by combining one molecule of tetrazotized dianisidin with one molecule of 2, 3, 6 naphtholdisulfo-acid and further coupling the intermediate product thus obtained with one molecule of paraxylidin.

2. As a new article of manufacture the new tetrazo dyestuff being an alkaline salt of an acid having the formula

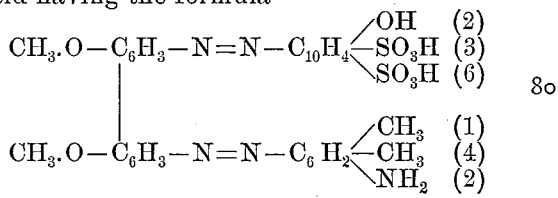

representing in the form of the sodium salt a brownish-black powder with a bronze-like luster soluble in water with a brownish-violet color, in concentrated sulfuric acid with a blue color, which changes into bluish-violet on the addition of a small quantity of ice while a blue flaky precipitate is obtained on adding a larger quantity of ice to the sulfuric-acid solution, dyeing unmordanted cotton violet shades.

In testimony whereof I have signed my name in the presence of two subscribing witnesses.

MYRTIL KAHN.

Witnesses:
R. E. JAHN,
OTTO KÖNIG.